US008163038B2

(12) United States Patent
Czarnecki et al.

(10) Patent No.: US 8,163,038 B2
(45) Date of Patent: Apr. 24, 2012

(54) LOW VOLATILE SUBLIMATION PRINTING

(75) Inventors: Richard Czarnecki, Wayne, NJ (US); Mark Finley, Haddonfield, NJ (US); Joseph Kissinger, Springfield, PA (US); Kenneth Smith, Saylorsburg, PA (US)

(73) Assignee: Superior Printing Ink Co., Inc., Teterboro, NJ (US)

( * ) Notice: Subject to any disclaimer, the term of this patent is extended or adjusted under 35 U.S.C. 154(b) by 0 days.

(21) Appl. No.: 13/037,673

(22) Filed: Mar. 1, 2011

(65) Prior Publication Data

US 2011/0283464 A1 Nov. 24, 2011

Related U.S. Application Data

(60) Provisional application No. 61/309,966, filed on Mar. 3, 2010.

(51) Int. Cl.
*D06P 5/00* (2006.01)
*C09D 11/02* (2006.01)

(52) U.S. Cl. ............. 8/467; 8/468; 8/469; 8/470; 8/471; 106/31.75

(58) Field of Classification Search .............. 8/467, 468, 8/469, 470, 471; 106/31.75
See application file for complete search history.

(56) References Cited

U.S. PATENT DOCUMENTS

| | | | |
|---|---|---|---|
| 4,244,358 A | 1/1981 | Pyers | |
| 4,773,953 A | 9/1988 | Hare | |
| 5,158,606 A | 10/1992 | Carlick et al. | |
| 5,417,749 A | 5/1995 | Krishnan et al. | |
| 5,431,721 A | 7/1995 | Pennaz et al. | |
| 6,200,372 B1 | 3/2001 | Krishnan et al. | |
| 6,709,503 B1 | 3/2004 | Krishnan et al. | |
| 7,018,453 B2 | 3/2006 | Klein et al. | |
| 2009/0155536 A1* | 6/2009 | Chang | 428/158 |
| 2009/0214790 A1 | 8/2009 | Simpson et al. | |

FOREIGN PATENT DOCUMENTS

| | | |
|---|---|---|
| JP | 3247677 | 11/1991 |
| JP | 5287228 | 11/1992 |
| JP | 200126735 | 7/1999 |
| WO | 2005113694 | 12/2005 |

OTHER PUBLICATIONS

English Abstract of IBM Thechnical Disclosure Bulletin dated Oct. 1, 1989.*

* cited by examiner

*Primary Examiner* — Eisa Elhilo
(74) *Attorney, Agent, or Firm* — Cowan, Liebowitz & Latman, P.C.; Mark Montague, Esq.

(57) ABSTRACT

A low volatile sublimation printing process comprises transferring a sublimation ink solid in an unsublimed form in a desired design by means of, for example, lithographic printing machinery, onto a medium such as paper. The image then is transferred from the medium onto a desired material in which sublimation takes place at the time of transfer onto that desired material. The sublimation ink can have a total volatile content of less than 10%, and preferably may have a total volatile content of less than 5%.

20 Claims, No Drawings

LOW VOLATILE SUBLIMATION PRINTING

REFERENCE TO RELATED APPLICATION

This application claims priority to U.S. Provisional Patent Application No. 61/309,966, filed Mar. 3, 2010, the disclosure of which is incorporated herein by reference.

FIELD OF THE INVENTION

The present invention is directed to lithographic printing. Specifically, the printing process utilizes a sublimation ink, containing a low amount of total volatiles, which is subsequently processed with heat to decorate a substrate. The present invention also relates to a method of transferring a design onto an object by means of printing the design onto a printable medium, and transferring the design from the printed medium to a substrate on which the design is to permanently appear.

BACKGROUND OF THE INVENTION

Words and designs are frequently printed onto clothing and other textile materials, as well as other objects. Common means of applying such designs to objects include the use of silk screens, and mechanically bonded thermal transfers. Silk screen processes are well known in the art, and a mechanical thermal process to textile materials is described in Hare, U.S. Pat. No. 4,244,358.

The use of computer technology has allowed almost instantaneous printing of images. For example, video cameras or scanning may be used to capture an image to a computer. The image may then be printed by any suitable printing means, including mechanical thermal printers, wet printed (inkjet) sublimation transfers and laser printers. These printers can print in multiple colors.

The process of thermal transfers by mechanical means is described in Hare, U.S. Pat. No. 4,773,953. The art, as developed under this patent, is well known and defined in practice. The resulting mechanical image, as transferred, is a surface bonded image with a raised plastic like feel to the surface. The resulting printed image is stiff to the feel, has poor dimensional stability when stretched and poor color range, providing the incentive to seek a better process to achieve a better result.

Sublimation ink solids change to a gas at about 350-400° F., and have a high affinity for polyester at the sublimation temperature and a limited affinity for most other materials. Sublimation is the process where the solid changes into a gas directly, without undergoing the normal liquid phase in between. Sublimation dyes get converted into gas from solid state as a result of the heat-transfer process. On applying heat and pressure, they subsequently get absorbed into the substrate on which the image is to permanently appear. Sublimation dyes form durable and virtually permanent images.

Printed matter can be generated by a number of processes and technologies, including flexographic, rotogravure, lithographic, and non-impact printing. Lithographic printing is a process which utilizes a coated metal or polymeric plate containing a hydrophobic image area which accepts, i.e., it is wetted by, hydrophobic based ink and a non-image hydrophilic area which accepts water, i.e., the fountain solution. As practiced in the prior art, high speed web presses use inks that contain organic solvents to transport the ink. The drying of the printed ink film is achieved by solvent volatilization at a substrate temperature of about 250-400° F. and, to some degree, by penetration of the ink oil into the paper, leaving behind a hard polymeric film. Consequently, the use of such inks in the prior art requires highly sophisticated emission control equipment in order to comply with clean air and occupational standards for exposure to organic solvents. Considering these environmental standards and the costs associated with complying with them under practical industrial conditions, artisans in the field of ink development have been vigorously engaged in the development of new inks that will more readily meet environmental standards but still provide the quality performance demanded for the final printed product.

A typical heat setting web offset ink will contain the following major components: (a) a high molecular weight ink resin to disperse the pigment and also to provide the toughness and gloss the ink requires on drying; (b) solvents to provide the fluidity to the ink before it is placed on the web and dried in an oven; (c) pigment; and (d) other minor components such as gellants, which provide structure to the ink, plasticizers (non volatile solvents), waxes, thickeners, and antioxidants.

The content of volatile organic compounds (VOC) in a lithographic ink is typically determined by EPA Method 24. A 0.3-0.5 gram sample of ink is heated to 110° C. for one hour and the weight loss (total volatiles), corrected for water content and exempt compounds, is used to determine VOC content. For inks that do not contain water or exempt compounds, the total volatiles is equivalent to the total VOC content. It is known in the art that there are lithographic inks which intentionally contain water, exempt compounds, or a combination of water and exempt compounds.

Sheetfed offset inks typically dry at room temperature by a combination of penetration and oxidation. Initial penetration of the ink oil into the paper or paper coating occurs very rapidly and it changes the ink composition sufficiently to induce precipitation of the polymer or resin-rich phase on the paper surface. Oxidation of the drying oils and/or resins also begins so that the ink film is sufficiently rigid to withstand limited mechanical forces and enables the job to be printed on the second side of the sheet very soon after completing the first side. Subsequently, further oxidation of the drying oils and/or resins further increases the rigidity of the ink film sufficiently to withstand rubbing and abrasion.

A typical sheetfed offset ink will contain the following major components: (a) a combination of resins such as a phenolic modified rosin ester and alkyds to disperse the pigment and also to provide the toughness and gloss the ink requires on drying; (b) oxidatively drying oils such as linseed oil; (c) high boiling paraffinic/naphthenic oils; (d) insoluble pigment(s), and (e) other minor components such as plasticizers (non volatile solvents), waxes, thickeners, and antioxidants. These inks contain some level of volatile content as a result of the high boiling paraffinic/naphthenic oil content. The typical percentage of volatile formulation components exceeds 10% by weight. Alternative sheetfed offset inks can be formulated without the use of volatile high boiling paraffinic/naphthenic oils, achieving a total volatile content of less than 10%.

There exists a specialized class of lithographic inks commonly referred to as "sublimation inks". These ink formulations differ in that insoluble pigments are replaced with soluble colorants commonly known and referred to in the art as a heat activated or sublimation colorants. Sublimation dyes typically derive from two classes; disperse dyes and direct dyes. These dyes are prepared from organic systems that include azo, anthroquinone and phthalocyanine chemistry.

These colorants are activated or sublimed at a temperature in excess of about 350-400 degree F., which is generally above the operation temperature of the offset lithographic printing press used to generate the first printed substrate (or transfer sheet). This type of colorant is known to be well suited for use in creating transfer mediums. The sublimation colorant is printed onto the first substrate, but is not activated or sublimed. Upon the subsequent application of heat and contact pressure the sublimation-type colorant is activated or sublimed, and transfers from the first substrate to the second substrate. After transfer, the sublimed colorant is bound to the second substrate.

A problem with the current art is that ink formulations contain high levels of volatile organic compounds (VOC's). Typical VOC levels are in the range of 20-30%. Printers are required by various Federal, State, and Local environmental regulations to track and report VOC emissions.

An additional problem with the current art is that VOC's are retained in the printed sublimation transfer sheet. According to EPA's guidelines, 95% of the VOC's contained in a sheetfed printing ink (as supplied) are retained in the printed image on the sublimation transfer sheet. When the transfer sheet is processed with heat to activate and transfer the sublimable dye, these VOC's are released into the workplace.

The present invention uses a lithographic sublimation ink. Existing lithographic sublimation ink technology employs the use of volatile organic compounds in excess of 10% by weight (typically as much as 20-30% by weight). Volatile organic compounds (VOC's) are undesirable components of printing inks as they are regulated materials under EPA regulations and cause detrimental environmental effects. Thus, it is desirable to design a lithographic sublimation ink which contains minimal VOC content.

U.S. Pat. No. 5,431,721 describes lithographic ink resins and varnishes which employ non-volatile solvents.

U.S. Pat. No. 7,018,453 describes low VOC web offset heatset inks containing less than about 2 wt % of VOC containing an aqueous polymer latex dispersed in an ink base of a resin, a non-volatile plasticizer, and a pigment and method for preparing same.

U.S. Pat. No. 5,417,749 describes a printing ink useful for "waterless" printing processes comprising a water-in-oil microemulsion wherein the water phase is present in an amount of about 5 to 20 wt. %, based on the weight of the ink. The water phase contains about 0.5 to 3 wt. %, based on the weight of the ink, of a surfactant which will not lower the surface tension (as measured at ambient temperature) of the ink, but will preferably increase the surface tension of the ink by at least about 5%. The ink optionally contains about 0.05 to 0.5 wt. %, based on the weight of the ink, of a water-soluble polymer capable of producing a viscosity in the water phase of about 5 to 10 poise as measured at ambient temperature.

U.S. Pat. No. 6,200,372 describes a single fluid water-based offset lithographic news ink comprising water; a macromolecular resin binder comprised of a resin soluble in water regardless of the pH of the water, a rosin salt resin soluble in water at pH ranging from 7.5 to 10 and an aqueous emulsion polymer; pigment; a water dispersible soy bean based polymer; and a hydroxyethylethylene urea re-wetting agent.

U.S. Pat. No. 6,709,503 describes a waterbased heatset offset lithographic ink comprising water, polyamide resins or fumarated rosin resins, hydroxyethylethylene urea, a modified linseed oil, a dibutylated benzoguanamine, a pigment and p-toluene sulfonic acid.

U.S. Patent Publication No. 2009/0214790 describes a method of making an ink-printed fibrous web by applying onto at least one side of a coated fibrous web at least one ink layer of a planographic ink to form an image thereon to produce a printed fibrous web. The ink layer(s) has a total volatile content, as supplied, of less than 10% (preferably less than 5%). These inks utilize insoluble pigments rather than sublimable colorants.

Other patent literature in the field includes Japanese Patent Publication JP 2001026735, Japanese Patent Publication JP 3247677, U.S. Pat. No. 5,158,606, and Japanese Patent Publication JP 5287228.

Patent Publication No. WO 2005113694 describes an emulsion composition that comprises water, a hydrocarbon distillate having a boiling point of 215 to 325° C., and a surfactant having a hydrophilic lipophilic balance number of 10 or less. A vehicle composition, an ink composition, a lithographic printing process and a method to improve a lithographic printing process comprise the emulsion composition which when used in a lithographic printing ink can reduce emission of volatile organic compounds and reduce the time at start-up to establish print quality.

In summary, prior art examples are based on insoluble pigmented systems rather than soluble sublimable dyes, and are not suitable for sublimation printing. Thus, there is still a need for the lithographic printing of sublimation inks on a medium which provide an environmental benefit of low volatile organic compounds (VOC's).

SUMMARY OF THE INVENTION

According to the present invention, there is provided a method for the lithographic printing of single or multiple superimposed sublimation ink layers on a medium (usually a fibrous paper sheet or web).

The present invention uses a lithographic sublimation ink. The sublimation ink solid is transferred in an unsublimed form in the desired design by means of lithographic printing machinery onto a medium, which will most commonly be paper. The image is then transferred from the medium onto the desired material. Sublimation does not take place at the time of printing onto the print medium, but rather takes place at the time of the transfer of the image from the medium to the substrate onto which the decorative image is to permanently appear. Accordingly, a sufficient temperature to sublime the ink solids must be used, which is typically around 350-400° F.

In one form of the invention, the method of printing comprises, preferably in the following order: (a) applying onto one or both sides of a medium at least one ink layer of a lithographic sublimation ink having a total volatile content of less than 10% (preferably less than 5%); and (b) process the printed medium using sufficient heat to sublime the ink solids image from the medium to the substrate onto which the decorative image is to permanently appear.

Other objects and advantages of the present invention will become apparent from the following description and appended claims.

DETAILED DESCRIPTION OF THE INVENTION

The present invention relates to a novel process for the printing of lithographic sublimation inks on a lithographic printing press, wherein the inks are formulated to achieve a total volatile content of less than 10%, preferably less than 5%. Total volatile content, defined as the sum total of volatile organic compounds (VOC) plus any other volatile compound that is not deemed to be a VOC (such as, but not limited to water) can be determined through the use of EPA Method 24.

According to the present invention, lithographic ink is printed on a medium, which is normally a fibrous sheet or web comprising a cellulosic material. The term "cellulosic material" denotes paper or board or a corresponding cellulose-containing material, which is derived from a lignocellulosic raw material, in particular from wood or from annual or perennial plants. The material can be wood-containing or wood-free (LWC, SC, coated printing papers and fine papers) and it can be produced from mechanical, semi-mechanical (chemi-mechanical) or chemical pulp. The pulp can be bleached or unbleached. The material can also contain recycled fibers, in particular reclaimed paper or reclaimed board. Typically, the grammage of the material web lies in the range of 20 to 500 g/m2.

The fibrous cellulosic sheet or web can be subsequently coated, which produces sharper, brighter images and better reflectivity than uncoated paper. Coated paper is modified by a process which applies chemicals, pigments, binders, and/or other substances to the fibrous surface(s) to supplement the sizings and fillers from earlier in the papermaking process. These surface modifying agents can include, for example, calcium carbonate, gypsum, aluminum silicate, kaolin, aluminum hydroxide, magnesium silicate, talc, titanium dioxide, barium sulfate, zinc oxide, synthetic pigment, or mixtures thereof.

In general, the grammage of base paper is 20-250 g/m2, preferably 30-80 g/m2. By coating a base paper of this type, having a grammage of approx. 50-70 g/m2, with 10-20 g of coating/m2/side and by calendering the paper, there is obtained a product having a grammage of 70-110 g/m2, whiteness of at least 90% and opacity of at least 90%. The invention is also suited for the production of coated fine papers, possibly also containing mechanical pulp, as well as writing and printing papers.

The method provided by the present invention for the application of one or more layers of ink on a medium. Once the ink has been deposited onto the medium, the medium can be optionally exposed to oven temperatures whereby the exit web temperature does not exceed 225° F. Following this step, the printed medium is further processed using sufficient heat to sublime the ink solids image from the medium to the substrate onto which the decorative image is to permanently appear.

Four experimental lithographic sublimation inks (cyan, magenta, yellow, and black) were prepared from the components set forth in Table A below. VOC content was measured using EPA Method 24:

TABLE A

| | Sublimable yellow ink | Sublimable magenta ink | Sublimable cyan ink | Sublimable black ink |
|---|---|---|---|---|
| Sublimation dye(s) | 9% | 16% | 18% | 30% |
| Phenolic modified rosin ester | 25% | 23% | 25% | 23% |
| Vegetable oil alkyd | 30% | 20% | 22% | 15% |
| Vegetable oils | 20.5% | 27.5% | 20.5% | 18.5% |
| Fatty acid ester | 15% | 13% | 14% | 13% |
| antioxidant | 0.5% | 0.5% | 0.5% | 0.5% |
| VOC content (EPA Method 24): | 0.56 | 1.46 | 0.72 | 0.74 |

EXAMPLE 1

Process cyan, magenta, yellow and black inks from Table A were printed on a forty inch Akiama Bestech printing press. Inks were printed on Alfa Net 50-70 pound offset stock with a sheet size of 28"×40". The press speed was between 7000-9000 impressions per hour. Blankets used were Infinity 4 ply compressible. Fuji plates were used. The fountain solution was Allied Press Control EWN 1-Step at a dose of 5 oz per gallon mixed with local tap water. The test inks came up to color quickly and were highly press stable.

In a second process, the printed sheets were transferred to fabrics made of 100% polyester and another fabric made with a 50% blend of polyester and cotton. Transfer temperatures were 200-220° C. with a dwell time of 10-15 seconds. Inks transferred to the fabric and were strong and brilliant.

It is to be understood that other expedients known to those skilled in the art or disclosed herein may be employed without departing from the spirit of the invention. Therefore, it is intended that the appended claims be interpreted as including the embodiments described herein, the alternatives mentioned above, and all equivalents thereto.

What is claimed is:

1. A method of printing, comprising:

printing one or more layers of ink on one or both of opposed surfaces of a medium to form an image thereon to produce a sublimation ink-printed medium, wherein the ink contains a maximum total volatile content of 10%.

2. The method of claim 1, wherein a colorant of the ink is a sublimable dye.

3. The method of claim 1, wherein the step of printing comprises lithographic printing.

4. The method of claim 1, wherein the step of lithographic printing utilizes conventional printing plates.

5. The method of claim 1, wherein the step of printing utilizes fountain solution.

6. The method of claim 1, wherein the step of printing utilizes waterless printing plates and does not require use of fountain solution.

7. The method of claim 1, wherein the step of printing includes printing with inks of different colors.

8. The method of claim 1, further comprising processing the printed medium using heat to sublime ink solids image from the medium to a substrate onto which the image is to permanently appear.

9. The method of claim 1, wherein printing comprises printing a sublimation ink solid in an unsublimed form on the medium; the method further comprising transferring the sublimation ink solid from the medium to a substrate.

10. The method of claim 9, wherein transferring includes subliming the sublimation ink solid at a time of transfer of the sublimation ink solid to the substrate.

11. A method of printing, comprising:

printing one or more layers of ink on one or both of opposed surfaces of a medium to form an image thereon to produce a sublimation ink-printed medium, wherein the ink contains a maximum total volatile content of 5%.

12. The method of claim 11, wherein a colorant of the ink is a sublimable dye.

13. The method of claim 11, wherein the step of printing comprises lithographic printing.

14. The method of claim 11, wherein the step of lithographic printing utilizes conventional printing plates.

15. The method of claim 11, wherein the step of printing utilizes fountain solution.

16. The method of claim 11, wherein the step of printing utilizes waterless printing plates and does not require use of fountain solution.

17. The method of claim 11, wherein the step of printing includes printing with inks of different colors.

18. The method of claim 11, further comprising processing the printed medium using heat to sublime ink solids image from the medium to a substrate onto which the image is to permanently appear.

19. The method of claim 11, wherein printing comprises printing a sublimation ink solid in an unsublimed form on the medium; the method further comprising transferring the sublimation ink solid from the medium to a substrate.

20. The method of claim 19, wherein transferring includes subliming the sublimation ink solid at a time of transfer of the sublimation ink solid to the substrate.

* * * * *